Figure 1:
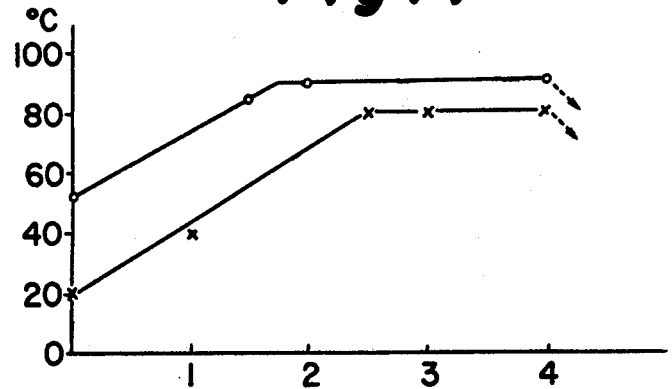

United States Patent [19]
Suzuki et al.

[11] 4,134,956
[45] Jan. 16, 1979

[54] METHOD OF FORMING A DECORATIVE LAYER ON A PRECAST CONCRETE BOARD

[75] Inventors: Yoshinori Suzuki, Tokyo; Akihiko Asayama, Kawasaki; Fumio Dohi; Takaharu Takahashi, both of Tokyo; Isao Toyomoto, Hiratsuka, all of Japan

[73] Assignee: Kowa Chemical Industry Ltd., Japan

[21] Appl. No.: 539,442

[22] Filed: Jan. 8, 1975

Related U.S. Application Data

[63] Continuation of Ser. No. 339,035, Mar. 8, 1975, abandoned.

[30] Foreign Application Priority Data

Nov. 14, 1972 [JP] Japan .................. 47-113522

[51] Int. Cl.² .............................................. B28B 1/16
[52] U.S. Cl. ................................... 264/256; 106/98; 106/315; 264/245; 264/333; 264/DIG. 57
[58] Field of Search ........ 264/245, 256, 333, DIG. 57; 106/76, 98, 315; 428/216

[56] References Cited

U.S. PATENT DOCUMENTS

| | | | |
|---|---|---|---|
| 2,004,465 | 6/1935 | Dietrichs | 264/245 X |
| 2,058,167 | 10/1936 | McQuade | 264/DIG. 57 |
| 2,695,850 | 11/1954 | Lorenz | 106/76 |
| 3,407,086 | 10/1968 | Voisinet | 428/216 |

OTHER PUBLICATIONS

*Calcium Chloride & Portland Cement*, Solvay Sales Corp., New York, N.Y., 1942, pp. 31–41.

*Primary Examiner*—Thomas P. Pavelko
*Attorney, Agent, or Firm*—McGlew and Tuttle

[57] ABSTRACT

A decorative coating layer, unified with the succulent and fragile surface of a concrete board, is formed by a method comprising laminating an inorganic and hydraulic coating material on the surface of an unhardened concrete board placed in a mold, and immediately thereafter heat-curing the thus coated concrete board. According to this method, beautifully dressed precast concrete boards can be mass-produced by a shortened process with improved efficiency of operation.

10 Claims, 3 Drawing Figures

METHOD OF FORMING A DECORATIVE LAYER ON A PRECAST CONCRETE BOARD

This is a continuation of application Ser. No. 339,035 filed Mar. 8, 1975 now abandoned.

SUMMARY OF THE INVENTION

The present invention relates to a method of forming a decorative layer on a precast concrete board. In recent years the industrialization of house building has been advocated and the so-called PC method by which precast concrete boards (hereinafter called PC boards) designed for house construction elements are assembled on the spot has become to be highlighted. However, the surfaces of the precast concrete boards are not finished sufficiently, so that most of the exterior and interior finishing work has to be carried out on the spot by means of scaffoldings.

Hitherto, the PC boards have been treated with decorative finishing at factory either before the concrete become hardened or after it has become hardened. The wellknown methods include a method of applying ceramic tiles to unhardened concrete surfaces, a method of giving washing finish to aggregate, and a method of giving rugged aptterns to architectural concrete surfaces. (cf. CIB, or Conseil International du Batiment pour la Recherches, l'Etude et la Documentation, Reports 1967-1968)

The above-mentioned method of applying ceramic tiles to unhardened concrete surfaces is practiced by putting an arranged and pasted tile sheet on the bottom of a mold and then placing concrete on it. After the mold is taken away, the sheet is removed from the concrete board and the tile joint is filled. A special skill is required for fixing the tile or straightening the tile joint, and the work cannot be carried out efficiently. In the method of giving a washing finish to aggregate, a surface retarder, which delays or prevents the solidification of concrete, is spread over the bottom of the mold, and then concrete is placed on it and allowed to stand for curing for the prescribed length of time. After the cured concrete is taken out of the mold, the surface layer is removed by water-washing so that the aggregate will be exposed. The other method of giving rugged patterns to architectural concrete surfaces is practiced by placing concrete in a mold having a bottom with rugged patterns on it so that the three dimensional patterns may be reproduced on the surface of the concrete board. These methods invariably suffer such disadvantages as difficulty in handling the surface retarder, or taking a long time either in arranging aggregate on the bottom of the mold or in treating the product after it is taken out of the mold.

The method of giving a decorative finish to the hardened concrete include a paint-finish method and a hammered-finish method. When the former method is practiced, the concrete board taken out of the mold has to be kept in a stock-yard for a long time for drying, while the latter is carried out by hammering off, mostly by hand, some parts of the surface of the concrete board as well as some of the aggregate so that a rugged finish may be given to the board. Therefore, the latter method is very inefficient and tends to lead to high production costs. Thus, it is known that none of the conventional methods of giving a decorative finish have proved satisfactory.

To give an example, in the PC board manufacturing method, currently adopted at a plant on 1 cycle/day system, concrete is placed (for about 10-20 minutes) on the preheated (at 50°-70° C) bottom of a mold, and set (for about 40-60 minutes); then it is given a trowel finish (for about 10-20 minutes). These retreatments usually take from 1 to 2 hours. Immediately thereafter, the concrete boards thus manufactured are put in a steam-curing vessel, and by the temperature gradient of 20° C/hr, with the maximum internal temperature not exceeding 80° C, they are steam-cured for 4 hours, followed by gradual cooling. The cured concrete boards are usually taken out of the mold the following morning.

When the production of PC boards is conducted on 2 cycles/day system, the pretreatment consisting of (i) placing hot (at 40° C) concrete kneaded in a hot mixer, on the preheated (at 50°-70° C) bottom plate of a mold, (ii) setting it, and (iii) giving a trowel finish is carried out in an hour or so, and immediately thereafter, the concrete boards thus made are put into a steam-curing vessel, where, by the temperature gradient of 20° C/hr, with the maximum internal temperature not exceeding 80°-90° C, they are steam-cured for 3.5 hours, followed by gradual cooling, and taking them out of the mold. The same process is repeated again and completed by the end of the day, and the product is taken out of the mold the following day.

It is clear that in order to promote the productivity of PC boards, the 2 cycles/day system is undoubtedly preferable, but as in the 1 cycle/day system, it involves the above-mentioned inefficient porcess of giving a decorative finish to the PC boards, which hinders the mass-production of house building.

An object of the present invention is to provide a method of giving a decorative finish to PC boards within the first 1 hour of pretreatment not only on 1 cycle/day system, but also on 2 cycles/day system, and to form a beautiful decorative layer by the time the boards are taken out of the mold, after being heat-cured. By this method, the decorative finish is given by the unification of the decorative layer with the unhardened surface of the concrete boards, therefore no peeling off of the layer takes place unlike in the case of tiles. Another object of the invention is to provide a method of preparing PC boards with no need of giving a decorative finish either for interior or exterior use, which method can be practiced with less man power and by a reduced number of workers. These objects can be attained by the method of the present invention described below.

On the surface of an unhardened concrete board, placed in a mold is laminated a hydraulic coating material consisting mainly of Portland cement and containing, as a curing agent, some inorganic salt, such as chlorides of alkali metal or alkaline earth metal, carbonates of alkali metal, and silicates of alkali metal, besides some additives such as water-proofing agent, cement-dispersing agent, defoaming agent, anticracking agent, coloring pigment, pigment-dispersing agent, and finely divided aggregate, all in effective quantity, and immediately heat-curing it for solidification so that a decorative layer may be formed on the surface of the precast concrete board.

To give a more detailed description of the method of the invention, it is characterized by changing and strengthening the comparatively succulent and fragile part of the surface of concrete placed in a mold into a tight structure unified with a layer of the hydraulic coating material. The hydraulic coating material employed in the practice of the invention must be such as gets solidified sooner than concrete and exhibits strength, but does not get solidified too soon or generate laitance on the surface of concrete.

Some curing agent consisting of one or more kinds of inorganic salts is added to Portland cement so that the strength of the coating film may be developed in a short time and the bonding strength between the coating film and the underlying concrete base may be intensified, besides improving the fragile texture of the concrete. Such inorganic salts are exemplified by chlorides of alkali metal or alkaline earth metal, e.g., calcium chloride, magnesium chloride, barium chloride, and sodium chloride; carbonates of alkali metal, e.g., potassium carbonate and sodium carbonate; silicates of alkali metal, e.g., sodium orthosilicate ($2Na_2O.SiO_2$), sodium metasilicate ($Na_2O.SiO_2$), disodium disilicate ($2Na_2O.2SiO_2$), tetrasodium pentasilicate ($4Na_2O.5SiO_2$), disodium trisilicate ($2Na_2O.3SiO_2$), sodium disilicate ($Na_2O.2SiO_2$), potassium metasilicate ($K_2O.SiO_2$), potassium trisilicate ($K_2O.3SiO_2$), and potassium tetrasilicate ($K_2O.4SiO_2$). The amount of the curing agent added to Portland cement is from 2 to 20 parts based on 100 parts of Portland cement, — usually from 0.5 to 10 parts in the case of chlorides of alkali or alkaline earth metal; from 0.5 to 8 parts in the case of carbonates of alkali metal; and from 2 to 10 parts in the case of silicates of alkali metal.

When necessary, some such known additives as cement-dispersing agent, water-proofing agent, pigment-dispersing agent, crack-preventive agent, defoaming agent, finely divided aggregate and coloring pigment may be added, in effective quantity, to the coating material.

Of these additives, the cement-dispersing agent is used for the purpose of reducing the ratio of water contained in the hydraulic coating material so as to promote the strength of the porduct and control the velocity of solidification, accelerated by the curing agent. To be more concrete, from 0.1 to 2.0 parts of gluconate which is represented by sodium gluconate $Na[HOCH_2(CHOH)_4COO]$ or calcium gluconate $Ca[HOCH_2(CHOH)_4COO]_2$ and/or from 0.1 to 1.0 part of alkylcellulose which is represented by methylcellulose:

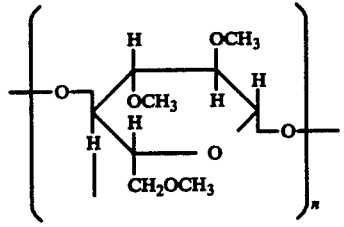

or hydroxyethylcellulose:

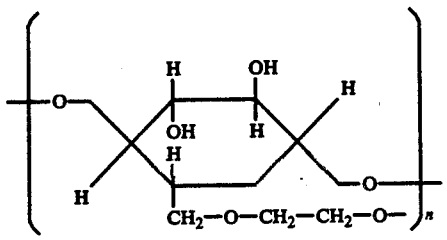

is employed.

Water-proofing agent is used for the purpose of giving water-resistance to the coating material, for which from 0.5 to 3 parts of metallic soap represented by calcium stearate, $Ca[CH_3(CH_2)_{16}COO]_2$, aluminum stearate, $Al[CH_3(CH_2)_{16}COO]_3$, or zinc stearate, $Zn[CH_3(CH_2)_{16}COO]_2$, are added to 100 parts of cement.

Pigment-dispersing agent is used so that pigment may be uniformly dispersed and uneven coloring may be prevented. For this purpose, from 0.1 to 1.0 part of surface reactant represented by naphthalene.formalin sulfonate condensate:

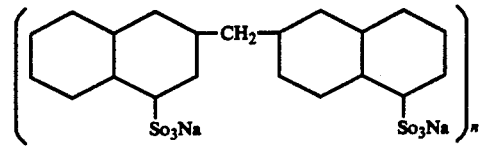

is employed.

Crack-preventive agent is used for the purpose of preventing the occurrence of cracks in the coating layer, for which from 1 to 5 parts of calcium sulfate, $CaSO_4.2H_2O$, or calcined plaster, $CaSO_4.\frac{1}{2} H_2O$ are added to 100 parts of cement.

As defoaming agent, which is used for killing foams generated from foaming additives contained in the coating material, either tributyl phosphate, $[CH_3(CH_2)_3O]_3PO$, or silicone oil, $(CH_3)_3.SiO.[(CH_3)_2SiO]_n.Si.(CH_3)_3$, is added in a quantity of from 0.1 to 0.3 parts.

For the purpose of increasing the quantity of cement and preventing the occurrence of cracks in the product, from 50 to 100 parts of finely divided aggregate, which is exemplified by quartz sand (main component; $SiO_2$ (dia.: 0.1–0.5 mm), and/or white sand (finely divided lime stone, main component: $CaCO_3$) are added to 100 parts of cement. In order to keep the surface of the product smooth, the diameter of the aggregate is preferred to be in the range of from 0.1 to 0.3 mm.

Coloring agent to be employed must have superior weather-resistance as well as alkali-resistance, and for this purpose, from 0.1 to 5 parts of iron oxide yellow, iron oxide red, iron oxide black, chrome oxide green, ultramarine blue, phthalocyanine blue, titanium oxide yellow, or titanium oxide white are used.

All the components given above are mixed and with an addition of water kneaded into a hydraulic coating material with a fluidity suitable to form a laminate, or rather with a viscosity in the range of from 5,000 to 50,000 cps as measured with Brookfield-type rotary viscometer (for low viscosity) No. 4 Rotor at 6 rpm. Any application method known in the art, such as spraying, may be employed for laminating the hydraulic coating material on the surface of the unhardened concrete. If, instead of a single hydraulic coating material which give a unicolored coating, different colored hydraulic coating materials are sprayed alternately, colorful finish may be obtained. As to the quantity of the coating material to be sprayed per square meter, it is known from the figures in Table 1, which shows the relation between the quantity of the coating material and the adhesion strength of the coating layer prepared, that from 2 kg/m² to 10 kg/m², or more preferably from 4 kg/m² to 6 kg/m² of it will be practicable.

Table 1.
Relation between the quantity of the coating material applied and the adhesion strength of the coating layer prepared.

| Quantity of the coating material applied | Adhesion strength Age of the coating material after application | |
|---|---|---|
| | 7 days | 28 days |
| 2.0 kg/m² | 5.0 kg/cm² | 5.3 kg/cm² |
| 2.5 | 6.0 | 6.2 |
| 3.0 | 6.1 | 6.6 |
| 4.0 | 9.2 | 9.8 |
| 5.0 | 10.2 | 9.6 |
| 6.0 | 12.6 | 15.8 |
| 10.0 | 12.5 | 16.1 |

(Curing temperature: 80° C, curing time: 4 hrs.)

Immediately after the prescribed quantity of the hydraulic coating material is sprayed to form a laminate over the surface of the unhardened concrete, place in a mold, it is heat-cured for solidification at a temperature between 20° C and 90° C. The compression strength and the adhesion strength of the product give the relation shown in Table 2.

Table 2.
Relation between the curing temperature and the strength of the product.

| Curing temperature | Item | Age of the coating material after application | | |
|---|---|---|---|---|
| | | 7 days | 14 days | 28 days |
| 20° C[1] | Compression strength | 137.5 kg/cm² | 157.7 kg/cm² | 185.5 kg/cm² |
| | Adhesion strength | 8.3 | 9.4 | 10.2 |
| 40° C[2] | Compression strength | 117.5 | 135.6 | 171.1 |
| | Adhesion strength | 8.4 | 9.2 | 9.7 |
| 60° C[2] | Compression strength | 120.5 | 143.1 | 175.0 |
| | Adhesion strength | 8.9 | 9.5 | 9.8 |
| 80° C[3] | Compression strength | 123.1 | 147.0 | 170.5 |
| | Adhesion strength | 8.6 | 9.0 | 9.5 |
| 90° C[3] | Compression strength | 136.0 | 150.7 | 178.0 |
| | Adhesion strength | 8.1 | 9.2 | 9.5 |

[1] The samples whose compression strength and adhesion strength come under the heading 20° C were let to stand in a thermostated (20° C) and humidistated chamber for 24 hours before they were taken out of the molds and thereafter let to stand in the same chamber as before.
[2] The samples whose compression strength and adhesion strength come under the heading 40 and 60° C were cured at the prescribed temperature for 5 hours, and after they were taken out of the molds, they were let to stand in a thermostated (20° C) and humidistated chamber.
[3] The samples whose compression strength and adhesion strength come under the heading 80 and 90° C were cured at the prescribed temperature for 4 hours, and after they were taken out of the frame, they were let to stand in a thermostated (20° C) and humidistated chamber.

After the heat-curing is over, the concrete boards, having been subjected to gradual cooling, are taken out of the molds, conveyed to the stockyard, where dirt attached to them in the course of curing is washed away. Then they are let to stand for cooling, and the desired decorative finish is obtained. When the temperature of the surface of the heat-cured decorative layer is cooled down to 40° C or under, some paint of synthetic resin may be applied to its surface to improve its beauty and durability.

The time required for cooling the precast concrete boards in the stockyard cannot be prescribed. Anyway it must be long enough for the temperature of the surface of the precast concrete boards to come down to 40° C or under, otherwise pinholes may occur in the coating layer applied to them.

Table 3 shows the work efficiency obtained by the method of the present invention as compared with those by the hitherto-known methods, proving the superiority of the method of the invention.

Table 3.
Work efficiencies obtained by various methods of giving decorative finish to precast concrete boards.

| Method of applying ceramic tiles to an unhardened concrete boards | 5–6 m²/man-day |
|---|---|
| Method of giving a washing finish to aggregate | 5 m²/man-day |
| Method of giving rugged patterns to architectural concrete boards | 4 m²/man-day |
| Method of present invention | 50–60 m²/man-day |

Some examples will be given below to explain in more detail preferred embodiments of the invention. They are not to be construed that the scope of the present invention would be limited thereto.

FIG. 1 Temperature curve showing the change of temperature within the curing vessel described in Example 1.

Figure 2:
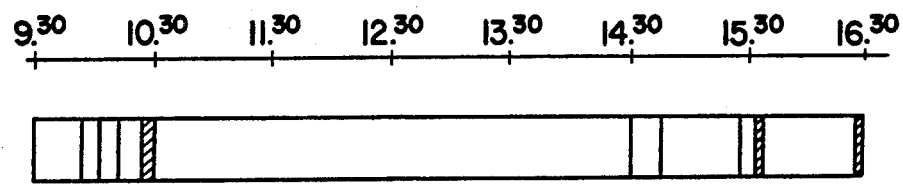

FIG. 2 Flowsheet for the production of precast concrete boards described in Example 1.

Figure 3:
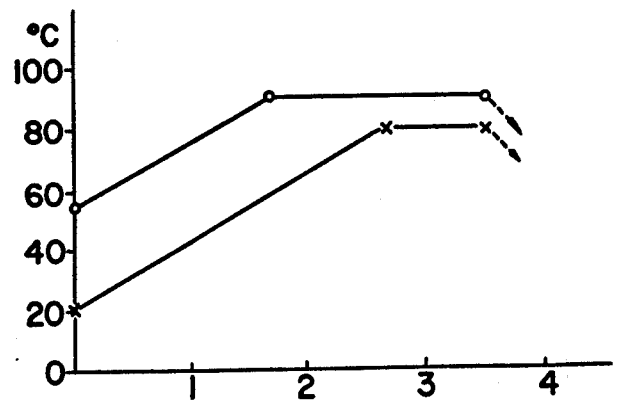

FIG. 3 Temperature curve showing the change of temperature within the curing vessel described in Example 2.

EXAMPLE 1

331 kg of Portland cement, 726 kg of sand, and 1134 kg of gravel per cubic meter of concrete were mixed, and to the mixture were added 147 l of water so that W/C of the mixture might be 0.44. The mixture was kneaded at room temperature for 30 minutes. Its slump value at this time proved to be 5.5 cm. On the bottom plate of a steam-curing vessel, preheated to 55° C, was put a molding frame of the size of 3,220 × 2,535 × 15 cm, and after iron or steel framework was embedded, concrete was placed, given vibration with a vibrator, and further treated with a screeder so that tight filling of the concrete might be guaranteed. The surface was given a smooth finish by wood trowel, and immediately thereafter the hydraulic coating material comprising the components given below was sprayed over the surface at the rate of 41 kg/m². The viscosity of the hydraulic coating material was measured with Brookfield type rotary viscometer (for low viscosity), No. 4 Rotor (6 rpm), obtaining the value of 22,500 cps. A pressure spray was employed for spraying the coating material. The time requied for completing the application was 9 minutes.

| Components of the hydraulic coating material | | |
|---|---|---|
| White Portland cement | 36.7 | parts |
| Finely divided agregate (White Japanese marble, dia.: 0.1 - 0.25 mm) | 29.1 | " |
| Sodium metasilicate | 1.6 | " |
| Potassium chloride | 1.1 | " |
| Sodium carbonate | 1.0 | " |
| Calcium stearate | 1.0 | " |
| Calcium gluconate | 0.3 | " |
| Naphthalene.formalin sulfonate condensate (Nopcosant K) | 0.2 | " |
| Calcined plaster | 1.1 | " |
| Tributyl phosphate | 0.1 | " |
| Titanium oxide white | 0.6 | " |
| Water | 27.2 | |
| Total | 100 | parts |

In practicing the experiment, the temperature curve for the bottom plate of the steam-curing vessel and that for the inside of the vessel were as given in FIG. 1. Curing was conducted for 4 hours, with the temperature gradient of 20° C/hr, the maximum temperature inside the vessel not exceeding 80° C. After the completion of curing, the concrete board was let to stand as before for cooling for 30 minutes, taken out of the mold and conveyed with a crane to the stockyard. The surface of the precast concrete board with a decorative finish was then washed with city water. When the temperature of the surface of the concrete board was lowered to 40° C, an acrylic resin varnish, Acryloid B-44 (Rohm & Haas), solid content: 20%, was sprayed with an airless spray gun at the rate of 0.6 kg/m$^2$, obtaining a precast concrete board with decorative finish of about 4–5 mm-thick and strong layer of a tight structure. The flowsheet of the process is given in FIG. 2.

The precast concrete board thus obtained presented a beautiful appearance with properties given in Table 4.

Table 4

Properties of the decorative layer (age: 28 days)

| Item | Value | Testing method |
|---|---|---|
| Adhesion strength | 9 kg/cm$^2$ | JIS A 6909 |
| Water permeability[1] | Quantity of water permeated: 0 g | JIS A 1404 |
| Impact resistance[2] | No change | JIS A 5410 |
| Washability resistance | No change after subjected to 2,000 strokes | JIS K 5663 |
| Hardness | H | Pencil hardness |
| Freeze-thaw stability | No change after 80 cycles | ASTM C 290-61 T |
| Water resistance[3] (Blistering | Nil | ASTM D714 |
| (Adhesion strength | 7 kg/cm$^2$ | JIS A 6909 |
| Weather resistance[4] (Gloss retention[5] | 70% | ASTM D523 |
| (Cracking | Nil | ASTM D661 |
| (Adhesion strength | 9 kg/cm$^2$ | JIS A 6909 |
| (Water permeability[1] | Water permeated: 0 g | JIS A1404 |
| (Impact resistance[2] | No change | JIS A5410 |

[1]Hydraulic pressure: 3 kg/cm$^2$
[2]A 500 g weight was dropped on the sample from the height of 50 cm.
[3]The sample was immersed in water of 20° C for 1 week before test.
[4]According to JIS K5400, the sample was let to stand outdoors, facing south at an angle of 30° C, for 2 years while exposed to weather (in the city of Tokyo).
[5]Gloss retention = $\frac{\text{The gloss of the sample having been exposed to weather for 2 years.}}{\text{The initial gloss of the sample}} \times 100\%$

EXAMPLE 2

Just as in Example 1, hot concrete (46° C) was placed in a vessel whose bottom plate was preheated to 55° C and was cured. The concrete board thus prepared was processed as in Example 1 to be given a decorative finish, the only difference being the steam-curing time which was 3.5 hrs. The temperature curve was as shown in FIG. 3. Acrylic resin varnish finish was carried out as described in Example 1. The properties of the decorative layer obtained gave the same values as in Example 1.

What is claimed is:

1. Method of forming a decorative coating on the surface of precast concrete board which comprises: pouring a concrete mixture consisting essentially of cement, aggregate and water into a mold, smoothing the surface of the resulting unhardened concrete, spraying an hydraulic coating material on the unhardened concrete having a good workability in the same mold at a coating density from about 4 to about 6 kg/m$^2$, and immediately thereafter heat-curing the so-coated concrete at a temperature between about 20° C and about 90° C for from about 3 to about 5 hours, said hydraulic coating material consisting essentially of a coating composition whose viscosity is between about 5,000 and 50,000 cps. and which is composed of (a) 100 parts by weight of Portland cement, (b) from about 2 to about 20 parts by weight of curing agent composition consisting essentially of at least one inorganic salt selected from the group consisting of alkali metal carbonate, alkaline earth metal carbonate, alkali metal chloride, alkaline earth metal chloride, and alkali metal silicate, and (c) an effective quantity of at least one additive selected from the group consisting of water proofing agent, cement dispersing agent, defoaming agent, crack-preventing agent, aggregate, coloring pigment and pigment-dispersing agent.

2. Method of forming a concrete coating on the surface of precast concrete board which comprises placing unhardened concrete consisting essentially of cement, aggregate and water in a mold, spraying a hydraulic coating material on the unhardened concrete in said mold at a coating density of from about 4 to about 6 kg/m$^2$, immediately thereafter heat-curing the so-coated concrete at a temperature between about 20° C and about 90° C for from about 3 to 5 hours, said hydraulic coating material consisting essentially of a coating composition whose viscosity is between about 5000 and 50,000 cps, and which is composed of (a) 100 parts by weight of Portland cement, (b) from about 2 to about 20 parts by weight of curing agent composition, said curing agent composition consisting essentially of at least one inorganic salt selected from the group consisting of alkali metal carbonate, alkaine earth metal carbonate, alkali metal chloride, alkaline earth metal chloride, and alkali metal silicate, and (c) an effective quantity of at least one additive selected from the group consisting of water proofing agent, cement dispersing agent, defoaming agent, crack-preventing agent, aggregate, coloring pigment and pigment-dispersing agent.

3. The method of claim 2, wherein said curing agent comprises from about 2 to about 10 parts of alkali metal chloride.

4. The method of claim 2, wherein said curing agent comprises from about 2 to 10 parts of alkaline earth metal chloride.

5. The method of claim 2, wherein said curing agent comprises from about 2 to about 8 parts of alkali metal carbonate.

6. The method of claim 2, wherein said curing agent comprises from about 2 to about 10 parts of alkali metal silicate.

7. The method of claim 2, in which the hydraulic coating material contains from about 2 to about 20 parts of an inorganic salt selected from the group consisting of from about 2 to about 10 parts of chloride of alkali metal or of alkaline earth metal; from about 2 to about 8 parts of carbonate of alkali metal, and from about 2 to about 10 parts of silicate of alkali metal.

8. The method of claim 7, in which the chloride of alkali metal or of alkaline earth metal is at least one chloride of the group consisting of calcium chloride, magnesium chloride, barium chloride, sodium chloride, and potassium chloride.

9. The method of claim 7, in which the carbonate of alkali metal is at least one carbonate selected from the group consisting of sodium carbonate and potassium carbonate.

10. The method of claim 7, in which the silicate of alkali metal is at least one silicate selected from the group consisting of sodium orthosilicate ($2Na_2O.SiO_2$), sodium metalsilicate ($Na_2O.SiO_2$), disodium disilicate ($2Na_2O.2SiO_3$), tetrasodium pentasilicate ($4Na_2O.5SiO_2$), disodium trisilicate ($2Na_2O.3SiO_2$), sodium disilicate ($Na_2O.2SiO_2$), potassium metalsilicate ($K_2O.SiO_2$), potassium trisilicate ($K_2O.3SiO_2$), and potassium tetrasilicate ($K_2O.4SiO_2$).

* * * * *